(12) United States Patent
Miriyala et al.

(10) Patent No.: US 7,464,150 B2
(45) Date of Patent: Dec. 9, 2008

(54) SMART AND INTEGRATED FCAPS DOMAIN MANAGEMENT SOLUTION FOR TELECOMMUNICATIONS MANAGEMENT NETWORKS

(75) Inventors: Hari P. Miriyala, Cupertino, CA (US); Anuj Jain, San Jose, CA (US); Salim Galou, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 11/253,648

(22) Filed: Oct. 20, 2005

(65) Prior Publication Data

US 2007/0094344 A1    Apr. 26, 2007

(51) Int. Cl.
 G06F 15/173   (2006.01)
 G06F 12/00   (2006.01)
(52) U.S. Cl. .................. 709/223; 709/229; 709/230
(58) Field of Classification Search ......... 709/223–229, 709/203, 250, 230
See application file for complete search history.

(56) References Cited

U.S. PATENT DOCUMENTS

| | | | |
|---|---|---|---|
| 5,659,736 A * | 8/1997 | Hasegawa et al. ........... 707/100 |
| 6,772,224 B2 * | 8/2004 | Kung et al. ................. 709/238 |
| 7,142,512 B1 * | 11/2006 | Kobayashi et al. .......... 370/232 |
| 2003/0063623 A1 * | 4/2003 | Leslie et al. ................ 370/466 |
| 2003/0154404 A1 * | 8/2003 | Beadles et al. .............. 713/201 |
| 2004/0044753 A1 * | 3/2004 | Toyoshima et al. ......... 709/223 |
| 2005/0021723 A1 * | 1/2005 | Saperia ...................... 709/223 |
| 2005/0108387 A1 * | 5/2005 | Li et al. ...................... 709/224 |
| 2006/0123479 A1 * | 6/2006 | Kumar et al. ................. 726/23 |
| 2006/0155862 A1 * | 7/2006 | Kathi et al. ................. 709/229 |

* cited by examiner

*Primary Examiner*—Zarni Maung
(74) *Attorney, Agent, or Firm*—Hanify & King, P.C.

(57) ABSTRACT

Operations pertaining to FCAPS domain operations can be performed by the present technology in a highly efficient manner as SmartFCAPS solution makes user free from several operational issues such as selection, navigation relationships among objects, etc. SmartFCAPS provides an operations system for the end-user to perform FCAPS operations on various objects defined across TMN pyramid which in turn are applied on composed objects transparently. SmartFCAPS provides context sensitive user interface by configuring FCAPS domains according to the objects and task at hand. In addition, SmartFCAPS provides a integrated and consolidated view of information and allows horizontal access to FCAPS domains as supported by the object in the context.

14 Claims, 5 Drawing Sheets

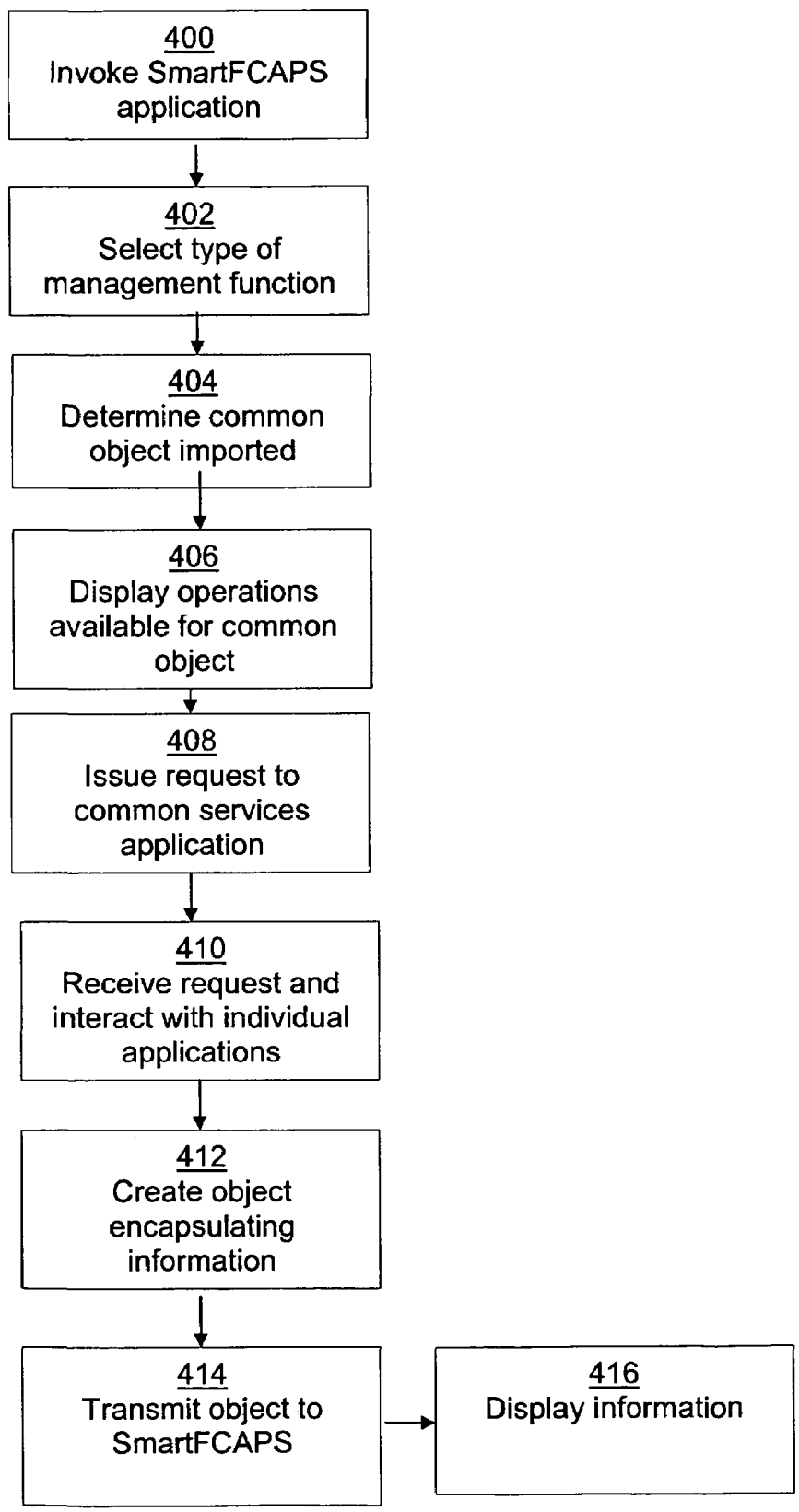

SMART AND INTEGRATED FCAPS DOMAIN MANAGEMENT SOLUTION FOR TELECOMMUNICATIONS MANAGEMENT NETWORKS

BACKGROUND OF THE TECHNOLOGY

1. Field of the Technology

The present technology relates to a method, system, and computer program product for managing a Telecommunications Management Network (TMN) using a Network Management System (NMS), and more particularly a method, system, and computer program product for enabling a NMS user to view information and perform operations across Fault, Configuration, Accounting, Performance and Security (FCAPS) domains in a horizontal fashion in a TMN layer independent manner.

2. Description of the Related Art

As telecommunications services have proliferated, telecommunications networks have become increasingly complex. Today, telecommunications networks, using technologies such as Synchronous Optical Network (SONET), Dense Wavelength Division Multiplexing (DWDM), Asynchronous Transfer Mode (ATM), Ethernet, etc., extend world-wide and include thousands of network elements (NEs). Typically, such networks require the capability to manage, provision, and maintain network elements that are manufactured by different venders.

Telecommunication Management Networks are managed using Network Management Systems (NMS). Objects managed by NMS are primarily defined by the scope of TMN layers. TMN layers include Network Element Layer (NEL), Element Management Layer (EML), Network Management Layer (NML), Service Management Layer (SML) and Business Management Layer (BML). Objects defined in these layers require support from NMS in one or more of the FCAPS domains.

Typically, management operations need to be applied on different types of objects across the TMN pyramid. Objects managed at a particular layer depend on other objects defined in lower layer and they need to be managed in a transparent manner. For example, trouble shooting a service object in the SML requires configuration management, performance management and fault management operations on both A-end and Z-end objects in the NML and the EML of a connection object that is carrying the service. Hence, selective operations in FCAPS domains need to be applied to multiple objects at same time to perform the trouble shooting operation. Typically, an application is provided for each FCAPS domain to perform management operations that can be performed in the respective FRCAPS domain. Using different applications to perform different management operations from different views is cumbersome and time consuming in certain scenarios.

Applications in the NMS provide different information and the ability to perform operations as designed with respect to the functional domain. And the information and functionality provided by each application may not be available to other applications or presented in a consistent manner. As a result, management information is provided in a disjoint manner, which makes it difficult for a user to determine the proper context and navigate across applications. Also, the user interface of an application is often fixed during the design phase and not adaptable to varying field and task requirements.

There exist a need for a method, system and computer program product to perform management operations on a telecommunications network. There is a need for the method, system and computer program product to perform management operations to manage different objects in Telecommunication Management Network layers by including its composed objects. There is a need for the method, system and computer program product to provide functionality in each of the FCAPS domains in a horizontal fashion in an integrated view. There is a need for the method, system and computer program product to provide context sensitive user interface adopting to object type and user task requirements. There is a need for the method, system and computer program product to improve the management of telecommunications networks and make the management more efficient.

SUMMARY OF THE TECHNOLOGY

The present technology provides integrated and horizontal access to FCAPS domains by providing flexible and context sensitive view to manage various objects in a telecommunication management network.

In an embodiment of the present technology, a method of enabling a NMS user to view information and perform operations across FCAPS domains in a horizontal fashion in a TMN layer independent manner is provided. The method includes importing a composite object corresponding to a type of management function, wherein the composite object is defined in an upper layer of a TMN and includes at least one object in a lower layer of the TMN, determining the types of management operation that can be performed on the composite object, and providing a user interface configured with at least one operation based on the types of management operations that can be performed on the composite object. The at least one operation requires interaction with a plurality of applications in the FCAPS domain.

In an aspect of the technology, the user interface is an integrated view across the FCAPS domain.

In an aspect of the technology, the method includes selecting the at least one operation.

In an aspect of the technology, the method includes translating the at least one operation to transparently perform operations on the at least one object in the lower layer of the TMN.

In an aspect of the technology, the method includes creating an object encapsulating information associated with the transparently performed operations.

In an aspect of the technology, the method includes displaying the information on the user interface.

In an aspect of the technology, determining the types of management operation that can be performed on the composite object includes reading a file representing the composite object based on the type of the management operation. In an aspect of the technology, the file is an XML file.

BRIEF DESCRIPTION OF THE DRAWINGS

The preferred embodiments of the present technology will be described with reference to the accompanying drawings.

FIG. 4 is an exemplary functional diagram of SmartFCAPS application according to the present technology.

DETAILED DESCRIPTION OF THE PREFERRED EMBODIMENTS

Figure 1:
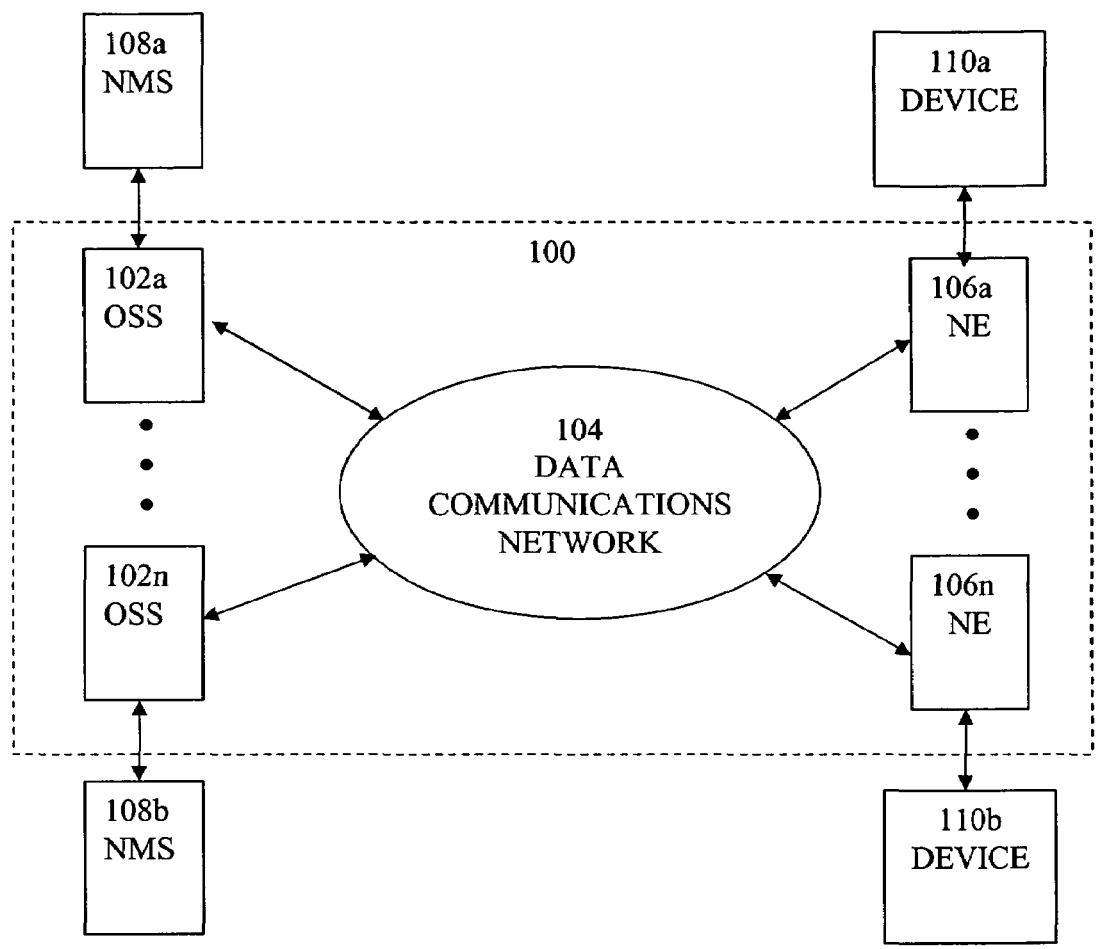
FIG. 1 is an exemplary block diagram of a telecommunications management 100 network 100, in which the present technology may be implemented.

The present technology provides integrated and horizontal access to FCAPS domains by providing flexible and context sensitive view to manage various objects in a telecommunication management network. The present technology implements features including, but not limited to, composite objects, integrated views, context based navigation, a task based user interface, and a configurable NMS interface. These features enable a NMS user to view information and perform operations across Fault, Configuration, Accounting, Performance and Security (FCAPS) domains in a horizontal fashion in a TMN layer independent manner.

Composite objects are objects defined in upper layer, such as the NML and above, and consists of multiple objects in lower layers, such as the EML and below. In an embodiment of the present technology, objects in upper layers are composite objects and those in lower layers as basic objects. Composite objects include, but are not limited to, a Connection object, a Service object, and a Logical NE (LNE) object. Basic objects include A-end Z-end Access IDentifiers (AIDs) in different NEs. This technology enables FCAPS operations to be performed on composite objects, which in turn are performed on the basic objects of the composite object in a seamless fashion. The NMS maintains the association between a composite object and its basic objects and performs the necessary translation of operation on the composite object into corresponding operations on its respective basic objects, such as a connection composite object with A-end and Z-end as basic objects. As an example, Performance Monitoring on a connection automatically results in enabling Performance Monitoring on both A and Z end basic objects. A user will be able to perform operations individually on A and Z end objects besides being able to implicitly perform operations on a respective composite object. Likewise, a user can view faults belonging to both A and Z ends in a single view as faults of Connection object itself but in a consolidated fashion. This technology captures such association among different objects to be able to allow a user to perform operations on objects at various levels.

An Integrated view an user interface presenting composite and basic objects and providing means to initiate various FCAPS operations and view consolidated response. In an embodiment of the present technology, individual FCAPS domains are integrated into single view to be able to allow a user to perform various operations offered by each of the various FCAPS domains from a single view. In an embodiment of the present technology, what operations are applicable on what type of composite objects are mapped and organized into channels, such as one channel per one domain. As an example, if the composite object in the context requires provisioning and monitoring, then Configuration, Fault and Performance domains are provided as three individual channels. A user can perform operations offered by respective domain by switching to the individual channel. A user interface provided by NMS will adjust its controls according to a user's choice of domain and configures itself to match the ability of the composite object in the context. Thus, a user can perform FCAPS domain operations from single integrated window and interpret different types of information from single place to be able to effectively respond to the practical scenario.

Context based navigation allows a user to import composite objects into a display to be able to manage them. An imported composite object can be of multiple types with varying capabilities and scope. The present technology captures mapping of composite objects with operations supported by them and allows the NMS to adjust its user interface including, but not limited to, object presentation styles, channels, and operations with respect to channels, at run-time. User selection of the composite object serves as a context, and the context is propagated into channels and operations are performed as supported by respective FACAPS domain. A user selection is retained through-out the request and response life cycle, thus, allowing user to better navigate and interpret the information by focusing on the task at hand.

Task based User Interface helps in addressing practical field scenarios effectively e.g.: a) if service is already up and running, service object needs monitoring to ensure desired Quality-of-Service (QoS) b) if a running service experience disruption, it needs trouble-shooting to identify and correct the problem. If NMS user interface is static and does not adopt to the user task in hand, the operational efficiency of user is compromised and it will reflect in the downtime and eventually in Service Level Agreements (SLA) compliance. This technology provides NMS solution to be able to adopt its user interface as per task in hand and guides user to achieve task in an efficient manner.

Configurable NMS User Interface: As explained in above paragraphs, the following mapping is required: a) composite object types with the operations supported by them across FCAPS domains and b) task types with the required operations. This technology captures such mapping in extensible Markup Language (XML) files per object type and per task type. These files are deployed as part of installation of NMS system. Depending on the context and task, NMS reads appropriate XML file and adjusts its user interface by enabling/disabling necessary channels/controls/operations. If specific customer or particular situation needs different set of mapping, it can be achieved by simply editing XML file and instructing NMS to use modified file. Architecture of NMS is such that any changes to the deployed information can be incorporated in to system without making any software changes.

An exemplary block diagram of a telecommunications management 100 network 100, in which the present technology may be implemented, is shown in FIG. 1. Telecommunications management network 100 provides the capability to manage, provision, and maintain the thousands of network elements in a telecommunications network that are manufactured by different venders in accordance with the present technology. Telecommunications management network includes an operational support systems (OSS) 102a-102n, a data communications network 104, and network elements 106a-106n. Network management systems 108a-108b and devices 110a-110b can couple to telecommunications management network 100.

Each of the OSS 102 couples to data communication network 104 and performs telecommunications management functions. Each network management system 108 can couple to an OSS 102 and perform functions to monitor and control telecommunications management functions utilizing the OSS in accordance with the present technology. Each of the network elements 106 couples to data communication network 104 and other network elements and perform functions that support the exchange of data, such as SONET data, Ethernet data, video data and voice data, between users of the telecommunications network. Network elements include, but are not limited to, switching systems, circuits terminals, and regenerators. A device 110 can couple to a network element 106 and receive and/or transmit data. Data communications network 104 is a network such as a packet-switched network or a frame relay-type network.

Figure 2:
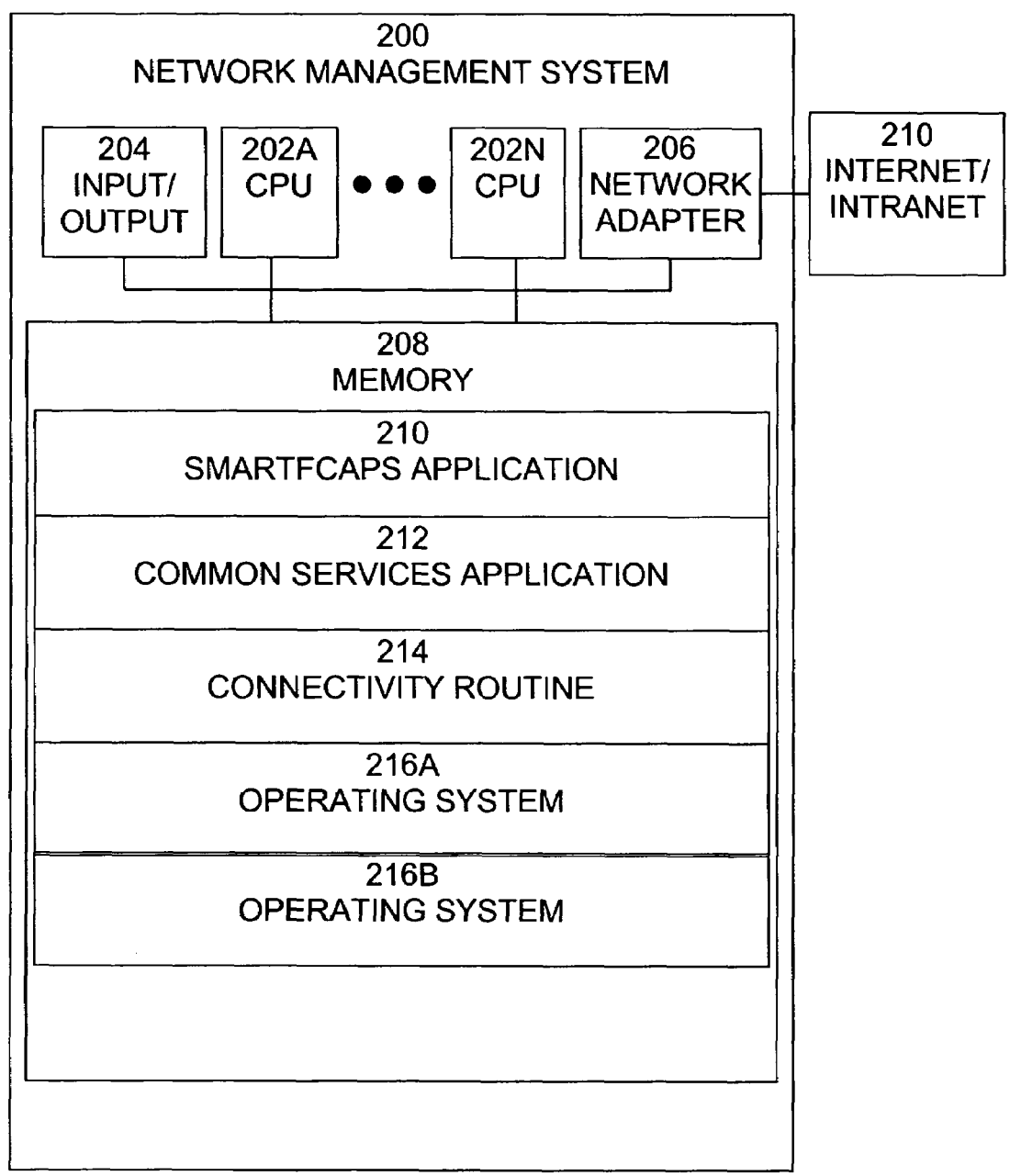
FIG. 2 is an exemplary block diagram of a network management system 200, in which the present technology may be implemented.

An exemplary network management system 200, in which the present technology may be implemented, is shown in FIG. 2. Network management system 200 is typically a programmed general-purpose computer system, such as a personal computer, workstation, client/server system, and minicomputer or mainframe computer running with FUJITSU's NMS solution—NETSMART® 1500.

Network management system 200 includes one or more processors (CPUs) 202A-202N, input/output circuitry 204, network adapter 206, and memory 208. CPUs 202A-202N execute program instructions in order to carry out the functions of the present technology. Typically, CPUs 202A-202N are one or more microprocessors, such as an INTEL PENTIUM® processor, or SPARC® RISC processor. FIG. 2 illustrates an embodiment in which network management system 200 is implemented as a single multi-processor client/server system, in which multiple processors 202A-202N share system resources, such as memory 208, input/output circuitry 204, and network adapter 206. However, the present technology also contemplates embodiments in which network management system 200 is implemented as a plurality of networked computer systems, which may be single-processor computer systems, multi-processor computer systems, or a mix thereof.

Input/output circuitry 204 provides the capability to input data to, or output data from, network management system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces network management system 200 with Internet/intranet 210. Internet/intranet 210 may include one or more standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of network management system 100. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface. In the example shown in FIG. 2, memory 208 includes, but is not limited to, SmartFCAPS application 210, Common Services application 212, connectivity routine 214 and operating systems 216A and 216B.

SmartFCAPS application 210 implements functionality to manage composite objects that correspond to various types of management functions, such as domain management, service management, connection management and typical network management. Each of these composite objects can support a combination of operations including, but not limited to, define domains, provisioning, accounting, trouble-shooting, fault and performance management. Each composite is characterized by an XML file which defines presentation and operations that can be supported on the composite object.

Figure 3A:
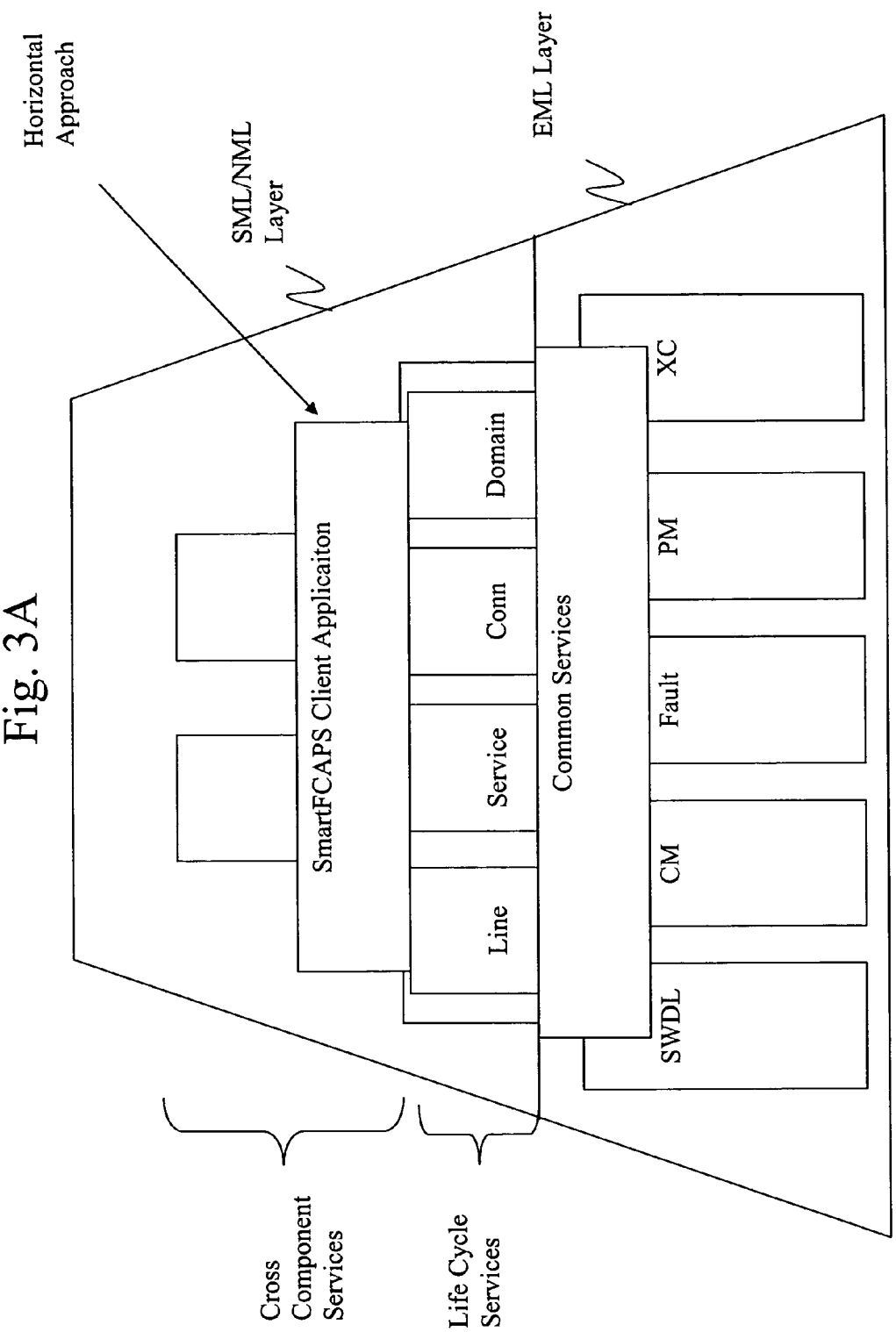
FIGS. 3A-3B are exemplary block diagram of a SmartFCAPS technology aligned with the Telecommunication Network pyramid according to the present technology.

Turning now briefly to FIG. 3A. An exemplary block diagram of the Management Layer Model and functional areas according to an embodiment of the present technology is shown in FIG. 3A. In the FIG. 3A embodiment of the present technology, bottom layer represents EML and above layer represents SML and NML. As it can be noticed that, without this technology, individual FCAPS applications, such as CM, Fault, PM etc. operate in a disjoint manner in a vertical fashion. The present technology defines a client application providing horizontal access to FCAPS domains using a Common Services framework. Composite objects in the upper layers are created using life-cycle services. Cross-component services provides a task based paradigm to the user by allowing the user to import composite object into the SmartFCAPS client application. Depending on the context and object type, SmartFCAPS client application provides necessary functionality as explained above. Based on actions performed by the user on the composite object, the SmartFCAPS client application invokes Common Services interface to be able to perform operations on respective basic objects.

Returning now to FIG. 2. Common Services application 212 is a server application that receives the request from SmartFCAPS client to perform the operation on basic objects that represent composite object. It interacts with the one or more FCAPS applications with multiple basic objects as inputs. And at the end of operation, single consolidated response is created and returned back to the SmartFCAPS client. SmartFCAPS application 210 and Common Services 212 communicate using connectivity routine 214.

Figure 3B:
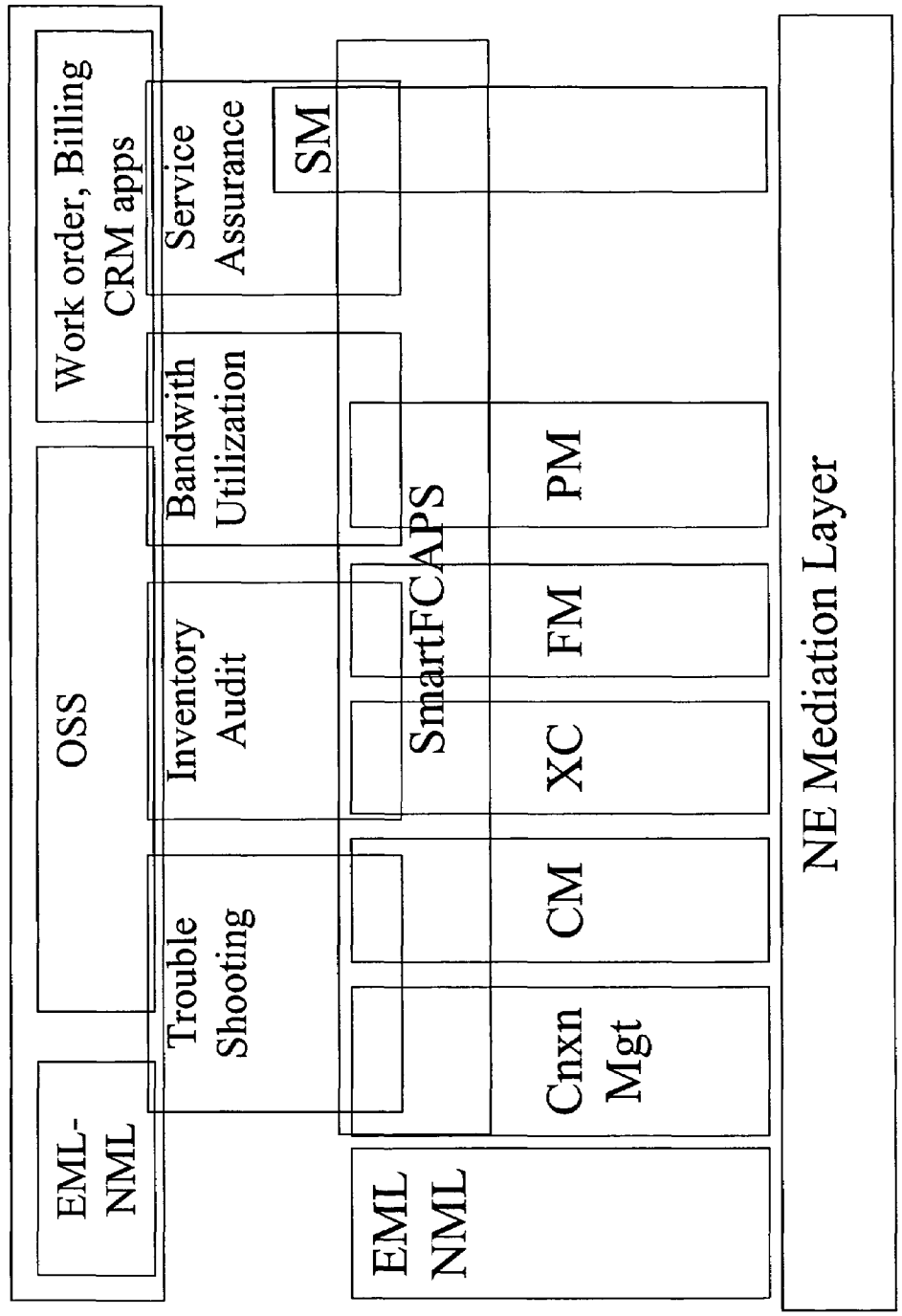

Turning now briefly to FIG. 3B. An exemplary block diagram of the TMN Model and functional areas according to an embodiment of the present technology is shown in FIG. 3B. This diagram depicts concepts defined in above paragraph in terms of applications. It can be noted that SmartFCAPS client application is providing an integrated view of FCAPS domains to cross-component tasks such as trouble-shooting etc.

Returning now to FIG. 2. Connectivity routine 214 provides services that allow multiple processes running on one or more machines to interact across a network. In an embodiment of the present technology, connectivity routine 214 implement A client/server architecture, such as a Common Object Request Broker Architecture (CORBA). Operating systems 216A and 216B provide overall system functionality. In an embodiment of the present technology, operating system 216A is a server operating system, such as a Solaris® operating system. In an embodiment of the present technology, operating system 216B is a client operating system, such as a Windows® NT or a Window® 2000 operating system.

As shown in FIG. 2, the present technology contemplates implementation on a client/server system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems.

Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

An exemplary data flow diagram of a process to integrate Fault, Configuration, Accounting, Performance and Security (FCAPS) domains to a single view in a layer independent manner according to the present technology is shown in FIG. 4. The SmartFCAPS application 210 and Common Services 212 communicate using connectivity routine 214 to perform the method of FIG. 4. The process begins in step 400. In step 400, a user of the present technology invokes the SmartFCAPS application. In step 402, the user selects the type of management function to be performed, wherein the type of management function represents context. In response to the selection of the management function, application imports a composite object corresponding to the context. In step 404, the application determines the common object imported and the operations that can be performed for the common object. In an embodiment of the present technology, the application reads a XML file that represents composite object in the context and configures user interface to display the composite object and controls to be able to invoke supported operations on the composite object. In step 406, the operations that can be performed for the composite object are displayed. In step 408, based on the operation selected by the user, a request is issued to the common services application. In step 410, the common services application receives the request and application. In step 410, the common services application receives the request and interacts with each of the individual applications required to obtain all the information associated with performing the operation as if it were done manually. In step 412, the common services application creates an object encapsulating all the information associated with performing the operation. In step 414, the common services application transmits the object to the application. In step 416, the information is displayed in a coherent and integrated fashion.

Although specific embodiments of the present technology have been described, it will be understood by those of skill in the art that there are other embodiments that are equivalent to the described embodiments. Accordingly, it is to be understood that the technology is not to be limited by the specific illustrated embodiments, but only by the scope the appended claims.

What is claimed is:

1. A method of enabling a NMS user to view information and perform operations across FCAPS domains in a horizontal fashion in a TMN layer independent manner, the method comprising:
    importing a composite object corresponding to a type of management function, wherein the composite object is defined in an upper layer of a TMN and includes at least one object in a lower layer of the TMN;
    determining the types of management operation that can be performed on the composite object by reading a XML file representing the composite object; and
    providing a user interface configured with at least one operation based on the types of management operations that can be performed on the composite object based on the XML file;
    wherein the at least one operation requires interaction with a plurality of applications in the FCAPS domain.

2. The method according to claim 1, wherein the user interface is an integrated view across the ECAPS domain 3. The method according to claim 1, further comprising selecting the at least one operation.

4. The method according to claim 3, further comprising translating the at least one operation to transparently perform operations on the at least one object in the lower layer of the TMN.

5. The method according to claim 4, further comprising creating an object encapsulating information associated with the transparently performed operations.

6. The method according to claim 5, further comprising displaying the information on the user interface.

7. The method according to claim 6, wherein the information displayed on the user interface changes in accordance with changes in the information.

8. A system for enabling a NMS user to view information and perform operations across FCAPS domains in a horizontal fashion in a TMN layer independent manner comprising:
    a processor operable to execute computer program instructions; and
    a memory operable to store computer program instructions executable by the processor, for performing the steps of
    importing a composite object corresponding to a type of management function, wherein the composite object is defined in an upper layer of a TMN and includes at least one object in a lower layer of the TMN;
    determining the types of management operation that can be performed on the composite object by reading a XML file representing the composite object; and
    providing a user interface configured with at least one operation based on the types of management operations that can be performed on the composite object based on the XML file;
    wherein the at least one operation requires interaction with a plurality of applications in the FCAPS domain.

9. The system according to claim 8, wherein the user interface is an integrated view across the ECAPS domain.

10. The system according to claim 9, further comprising the memory operable to store computer program instructions executable by the processor, for performing the step of selecting the at least one operation.

11. The system according to claim 10, further comprising the memory operable to store computer program instructions executable by the processor, for performing the step of translating the at least one operation to transparently perform operations on the at least one object in the lower layer of the TMN.

12. The system according to claim 11, further comprising the memory operable to store computer program instructions executable by the processor, for performing the step of creating an object encapsulating information associated with the transparently performed operations.

13. The system according to claim 12, further comprising the memory operable to store computer program instructions executable by the processor, for performing the step of displaying the information on the user interface.

14. The system according to claim 12, wherein the information displayed on the user interface changes in accordance with changes in the information.

* * * * *